(12) United States Patent
Bartholomä et al.

(10) Patent No.: US 7,128,345 B2
(45) Date of Patent: Oct. 31, 2006

(54) TERMINAL CONNECTION COMPRISING A THREADED SLEEVE, A COUNTER-SLEEVE AND A TERMINAL INSERT

(75) Inventors: Mario Bartholomä, Winden (DE); Fritz Zügel, Waldkirch (DE); Volker Götz, Kenzingen (DE); Philipp Gerber, Gutach-Bleibach (DE)

(73) Assignee: Anton Hummel Verwaltungs GmbH, Waldkirch (DE)

( * ) Notice: Subject to any disclaimer, the term of this patent is extended or adjusted under 35 U.S.C. 154(b) by 0 days.

(21) Appl. No.: 10/502,215

(22) PCT Filed: Jun. 6, 2003

(86) PCT No.: PCT/EP03/05970

§ 371 (c)(1),
(2), (4) Date: Jul. 20, 2004

(87) PCT Pub. No.: WO2004/015318

PCT Pub. Date: Feb. 19, 2004

(65) Prior Publication Data

US 2005/0077725 A1    Apr. 14, 2005

(30) Foreign Application Priority Data

Jul. 26, 2002   (DE) ............................ 202 11 333 U

(51) Int. Cl.
*F16L 27/00* (2006.01)
(52) U.S. Cl. .................. 285/137.11; 285/90; 285/143.1
(58) Field of Classification Search ............. 285/136.1, 285/143.1, 137.11, 222, 92, 90, 89, 86, 322
See application file for complete search history.

(56) References Cited

U.S. PATENT DOCUMENTS

| 4,927,187 | A | * | 5/1990 | Sanford et al. ................ 285/92 |
| 5,378,027 | A |   | 1/1995 | Gehring |
| 5,763,833 | A | * | 6/1998 | Bawa et al. ............. 285/136.1 |
| 5,799,987 | A |   | 9/1998 | Sampson |

FOREIGN PATENT DOCUMENTS

| DE | 299 08 267 | 8/1999 |
| WO | WO 02/43211 | 5/2002 |

* cited by examiner

*Primary Examiner*—Aaron Dunwoody
(74) *Attorney, Agent, or Firm*—Volpe and Koenig, PC

(57) ABSTRACT

A terminal connection (1) is provided that includes a threaded sleeve (2) and a counter sleeve (3) that can be connected to it, and a terminal insert that can be pressed against an elongated body (4). The connection has a coupling element (6) that can be detachably connected to the connection and includes a depression (7) and a passage (8) for the elongated body (4), and a radially protruding collar located on the threaded sleeve (2) fits and can be inserted into the depression (7). The coupling element (6) has radially inwardly directed projections (9) for engaging over the collar of the threaded sleeve (2) in the coupling position that are located on a front edge of the depression in the insertion direction of the threaded sleeve (2). The coupling element (6) has a fixing area (10) adjacent to the depression (7) for connecting to a counterpart or a retaining nut and/or through opening (11) of a housing (12), to which the terminal connection (1) is to be attached. This enables the elongated body to be connected in a fixed manner to a counterpart or housing prior to its fixation and to be subsequently mounted.

14 Claims, 5 Drawing Sheets

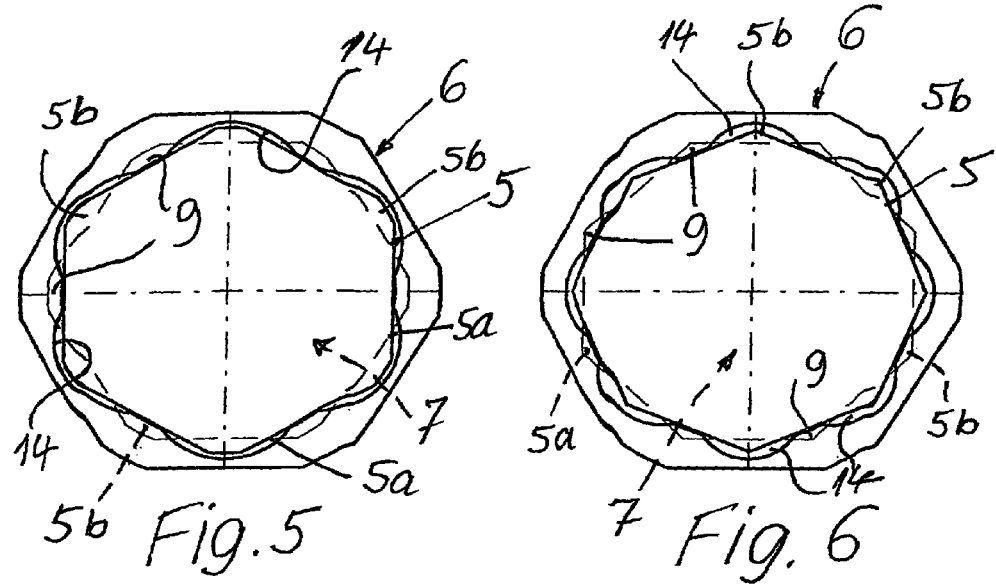
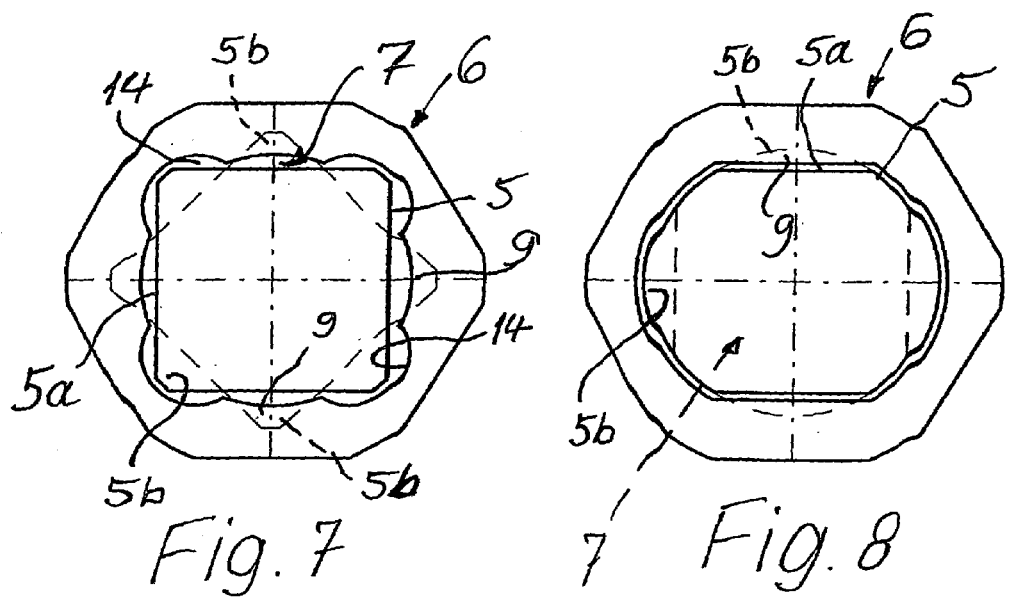
Fig. 5  Fig. 6  Fig. 7  Fig. 8

TERMINAL CONNECTION COMPRISING A THREADED SLEEVE, A COUNTER-SLEEVE AND A TERMINAL INSERT

BACKGROUND

The invention relates to a terminal connection comprising a threaded sleeve, a counter-sleeve or a similar counterpart that can be connected to the threaded sleeve, and a terminal insert that can be pressed against an elongated body, such as a cable, tube, hose, rod, or the like, wherein the counter-sleeve or the counterpart exerts pressure on or covers the terminal insert with a ring-like contact surface at least on one of the ends and for tightening on a thread with a tapering shape, e.g., by means of rounding or a cone, which is arranged on the terminal insert, in the threaded sleeve, or instead of the ring-like contact surface on the counter-sleeve, an area of the terminal insert provided with slots or similar free spaces is deformed radially against the elongated body and wherein the threaded sleeve has a radially projecting collar or flange, whose peripheral contours are especially non-round or polygonal.

Such a terminal connection is known in several embodiments from EP 0 528 233 B1 and has proven to be effective. Above all, this known terminal connection is well suited for mounting, e.g., a cable on a through-opening of a housing, wherein the contact of the terminal insert on the cable is realized only when the terminal connection is mounted in the through-opening of the housing and the cable has been inserted.

However, there are cases, in which an elongated body, especially a cable, is already tightly connected to a terminal connection and only then should be mounted on a counterpart or housing through-opening. This means that the terminal insert is screwed on together with the elongated body held by it, e.g., with the help of a mounting section with thread, and thus the already clamped body must also be rotated.

Therefore, there is the problem of creating a terminal connection of the type mentioned in the introduction, with which an elongated body is already tightly connected before its mounting on a counterpart or a housing through-opening and then can be mounted later without having to turn the elongated body several times according to a screw motion.

SUMMARY

The solution of this apparently contradictory task is that the terminal connection defined in the introduction includes a coupling piece that can be connected to the terminal connection in a detachable way with a depression and a through-opening for the elongated body, wherein the radially projecting collar of the threaded sleeve fits and can be inserted into this depression. The coupling piece has projections in the front edge region of its depression in the insertion direction of the threaded sleeve, and the coupling piece has adjacent to the depression an attachment region for connecting to a counterpart or a retaining nut and/or a through-opening of a housing.

In this way, it is possible to already connect an elongated body tightly to the terminal connection and then to couple it with the coupling piece connected on its side to a counterpart, a housing through-opening, or a retaining nut, so that no or only slight rotation of the terminal connection relative to the coupling piece and thus the elongated body or cable is necessary. Thus, the elongated body can be already connected tightly to a desired and matching terminal connection, and then this connection is only inserted axially into its depression for mounting and locked in the coupling piece.

Here, it is especially favorable when the attachment region of the coupling piece is an external thread section, which matches an internal thread of a housing through-opening or a retaining nut or a similar counterpart. Thus, the coupling piece can be installed already tight before insertion of the terminal connection in that it is screwed onto a corresponding counter-thread. If necessary, here this coupling piece can first be already coupled with the terminal connection tightly attached to an elongated body, so that it can be delivered in common with this part. Before assembly, the coupling piece is then first detached from the terminal connection and mounted on the counterpart, after which the terminal connection can then be reconnected to the now installed coupling piece with at most a small rotational motion.

Here, it is especially advantageous when the threaded sleeve adjacent to the collar has an attachment section, e.g., an external thread, with which it can be connected in a detachable way to a counterpart or a retaining nut and/or a through-opening of a housing. It is also advantageous when the attachment section of the threaded sleeve and the attachment region of the coupling piece agree. Therefore, either the coupling piece or else also the attachment section of the threaded sleeve are then adapted to the same counterparts, nuts, or through-openings provided with threads for housings, so that selectively an initially still open terminal connection or an already tight terminal connection provided with an elongated body can then be mounted on the counterpart or housing with the help of a coupling piece according to the invention. In addition, the threaded sleeve can be a commercially available part of a terminal connection that can be used without a coupling piece, so that production and stock keeping is made more favorable.

The coupling piece can have intermediate spaces of greater radial extent between the radially inner projections, wherein the extent of the intermediate spaces in the radial and circumferential direction is equal to or greater than that of the radially projecting regions or edges of the non-round or polygonal collar of the terminal connection. The radially inner projections of the coupling piece project opposite it so far that the flattened sections fit between the edges or projections of the non-round or polygonal collar between them and the non-round or polygonal collar can be rotated after the axial insertion at least as far under the projections of the coupling piece so that its projecting regions or edge regions are arranged under or behind the projections of the coupling piece. This configuration of the coupling piece thus allows it to produce a positive fit in the axial direction through a slight rotation, thus the terminal connection is connected tightly to the coupling piece with practically only one hand.

An advantageous configuration of the invention includes at least one terminal screw or the like that can be tightened especially in the radial direction for exerting pressure on the outside of the collar in the coupling position arranged on the coupling piece. Thus, the coupling position produced once can be fixed very easily and can be secured against undesired detachment, e.g., due to vibrations.

The terminal screw(s) can be arranged in the region of an intermediate space between two radial projections of the coupling piece axially at the height of the peripheral surface of the collar engaging in the position of use and in the coupling position, a flat side can exert pressure on the periphery of the non-round collar. Therefore, the case where the terminal connection turns relative to the coupling piece forwards or backwards and thus inadvertently releases the connection can be excluded.

The number of projections extending radially inwards to the coupling piece and the intermediate spaces arranged between them can correspond to the number of edges or regions of the collar of the threaded sleeve extending opposite flattened sections. Thus, for a hexagon, e.g., six projections in between six intermediate spaces can be provided, so that initially the edges of the hexagonal collar can be inserted axially through the intermediate spaces and then, through a slight rotation, all can be moved behind a projection of the coupling piece.

For coupling or locking the threaded sleeve to the coupling piece, a relative mutual rotation can be performed by an angle, which is given by dividing 180° by the number of projections or intermediate spaces and edges or the like. If the collar, e.g., has a rectangular shape, a rotation by 45° is given to produce a corresponding coupling. The already mentioned configuration as a hexagonal collar with a correspondingly shaped coupling piece means that for locking or coupling, a relative rotation by 30° is to be performed, etc.

It should be mentioned that the retaining screw(s) can be a stud screw, which does not project to the outside of the coupling piece in the position of use.

It should be further mentioned that the depression on the coupling piece and its attachment region can be arranged axially one behind the other, so that the elongated body can be guided practically in a straight line from the threaded sleeve. However, an angled arrangement is also possible when the elongated body is inserted into the housing at a corresponding angle. The angle of the longitudinal center axis of the attachment region opposite that of the depression of the coupling piece can be, for example, 90°. However, other angles are also conceivable.

A modified embodiment could also include at least one of the projections of the coupling piece being adjusted after the insertion of the collar of the threaded sleeve into the depression from a retracted position approximately radially inwards, e.g., it can be tightened by means of a thread. If necessary, this can partially or even completely prevent a slight relative rotation of the threaded sleeve relative to the coupling piece from still being needed for mutual coupling. However, for this purpose a corresponding radial adjustability of individual or several projections must be provided for covering the collar.

Above all, for combinations of individual or several of the previously described features and measures, a fast assembly of preconfigured cables or similar elongated bodies is enabled with the help of a terminal connection or cable connection of conventional construction, wherein this cable connection can be connected preassembled or preconfigured to the cable, without the user having to open the cable connection or terminal connection to be able to attach it to a counterpart or housing. The coupling piece is used in this case as an adapter to produce the transition from the conventional already installed cable or terminal connection to the counterpart.

An advantageous and preferred configuration of the arrangement of terminal connection and coupling piece can be provided, such that within the depression of the coupling piece as an axial stop for the collar an elastic ring, especially a sealing ring or an O-ring is provided, which is somewhat compressed preferably in the axial direction in the position of use. Here, it can interact with a phase or diagonal within the depression. Above all, such an elastic ring produces not only a seal within the coupling piece or adapter, but also exerts an axial restoring force on the collar in the sense that it engages under the projections of the coupling piece without play.

BRIEF DESCRIPTION OF THE DRAWINGS

In the following, embodiments of the invention are described in more detail with reference to the drawings. Shown in partially schematic views are:

FIG. 5 is a view of a hexagonal collar or flange of the threaded sleeve and the inlet opening in the depression of the coupling piece with six projections and six intermediate spaces between these projections, which cover the edge regions after axial insertion of the hexagonal collar and a rotation by 30°, FIG. 6 is a view corresponding to FIG. 5, for which a collar with eight edges and a correspondingly shaped depression of the coupling piece are shown and for coupling a rotation by 22.5° is provided, FIG. 7 is a view corresponding to FIGS. 5 and 6 for an approximately rectangular or quadratic collar, which is rotated for coupling with the coupling piece by 45°, and also FIG. 8 is a view of a collar with two flattened sections and arc-shaped projections arranged between these sections, which fit into a corresponding recess of the coupling piece and are rotated for coupling by approximately 90°.

DETAILED DESCRIPTION OF THE PREFERRED EMBODIMENTS

Figure 1:
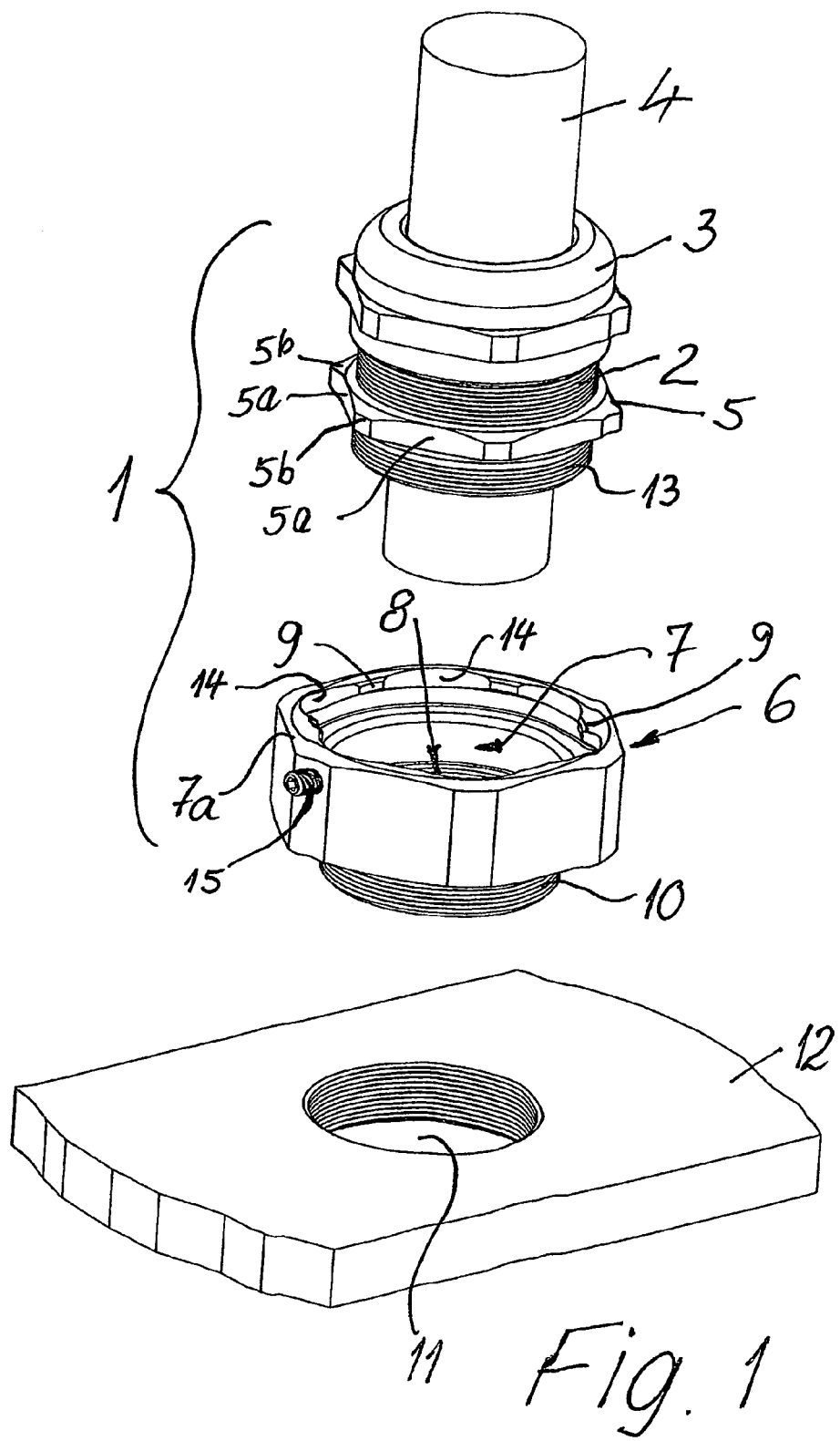
FIG. 1 is a perspective exploded view of a terminal connection, for which an elongated body is already preassembled within a threaded sleeve, a counter-sleeve that can be screwed onto this threaded sleeve, and a terminal insert can be inserted into a coupling piece belonging and matching this terminal connection, which can be inserted on its side with an attachment region with an external thread in a through-opening of a housing with an internal thread.

For the following description of various embodiments of a terminal connection designated overall with 1, corresponding parts are provided with the same reference symbols or numbers, even if they differ in shape or configuration. In the case of a particular embodiment in which such parts or functions are not described in further detail, they have the same meaning as for those embodiments for which these parts or functions are explained.

The shown terminal connections 1 each have a threaded sleeve 2, a counter-sleeve 3 that can be connected to this threaded sleeve, preferably in the form of a cap nut or a similar pressure part, and a terminal insert that can be pressed with the help of this counter-sleeve or cap nut 3 against an elongated body 4, preferably a cable, and while not shown in the figures, this can either be a part that can be inserted separately, above all when the threaded sleeve is formed of metal, or can be integrally connected to the threaded sleeve for products made from plastic, as is known from EP 0 528 233 B1.

As is also known from EP 0 528 233 B1, the counter-sleeve 3 covers the terminal insert with a ring-like contact surface at least on an end of the terminal insert, but can also exert pressure in the position of use on other regions, especially on the radial outer surfaces of such a terminal insert. In a known way, with such a ring-like contact surface during tightening of the thread between the threaded sleeve 2 and counter sleeve 3, based on a tapering shape, e.g., by means of rounding or a cone, a region provided with axial slots for the terminal insert is deformed and pressed radially against the elongated body 4. In this way, the elongated body 4 can be clamped and connected to the threaded sleeve 2.

The threaded sleeve 2 has a radially projecting collar or flange 5, in the following called "collar 5," whose peripheral contours are non-round, and preferably polygonal according to FIGS. 5–8. According to FIGS. 1–5, the collar 5 is hexagonal, which corresponds to a typical shape of a nut or a screw head and thus also matches well to corresponding wrenches or similar tools. However, according to FIG. 6 it can also be octagonal, according to FIG. 7 rectangular, or according to FIG. 8 non-round such that two opposing flattened sections are connected by opposing radially larger, arc-shaped regions.

Figure 2:
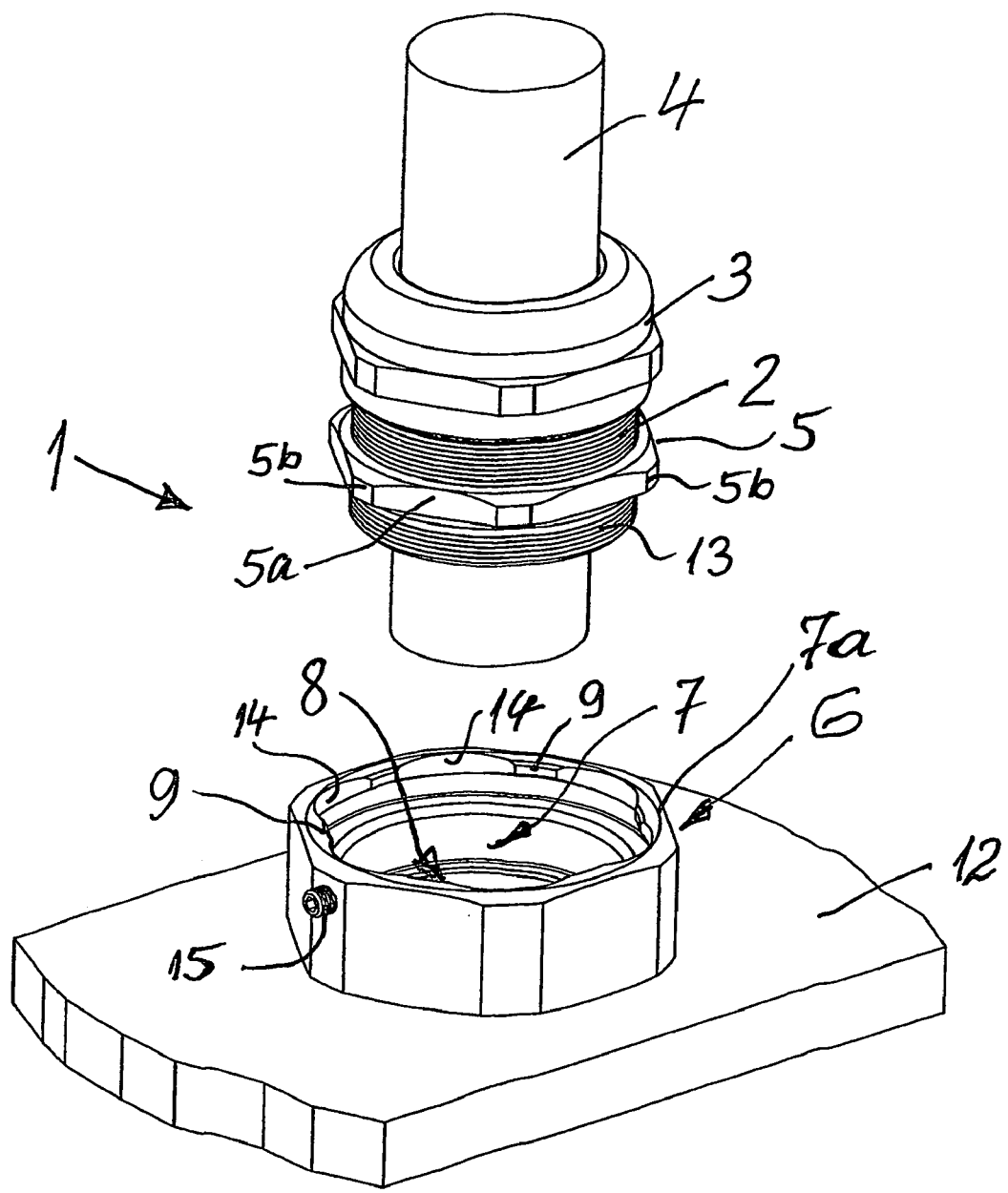
FIG. 2 is a view corresponding to FIG. 1, wherein the coupling piece is attached to the housing, so that the elongated body can be inserted with the preassembled terminal connection therein, without this insertion process requiring several turns of this connection relative to the housing.

In addition, in a feature that is different from the terminal connection according to EP 0 528 233 B1, the terminal connection 1 includes a coupling piece 6, which can be connected to it in a detachable way and which can be used as an adapter. This coupling piece 6 is provided with a depression 7 and with a through-opening 8 for the elongated body 4. According to FIGS. 3 and 4 the radially projecting collar 5 of the threaded sleeve fits and can be inserted into this depression 7. In FIGS. 1 and 2, this insertion process is not yet performed, but in FIGS. 3 and 4 it has already been performed.

Figure 3:
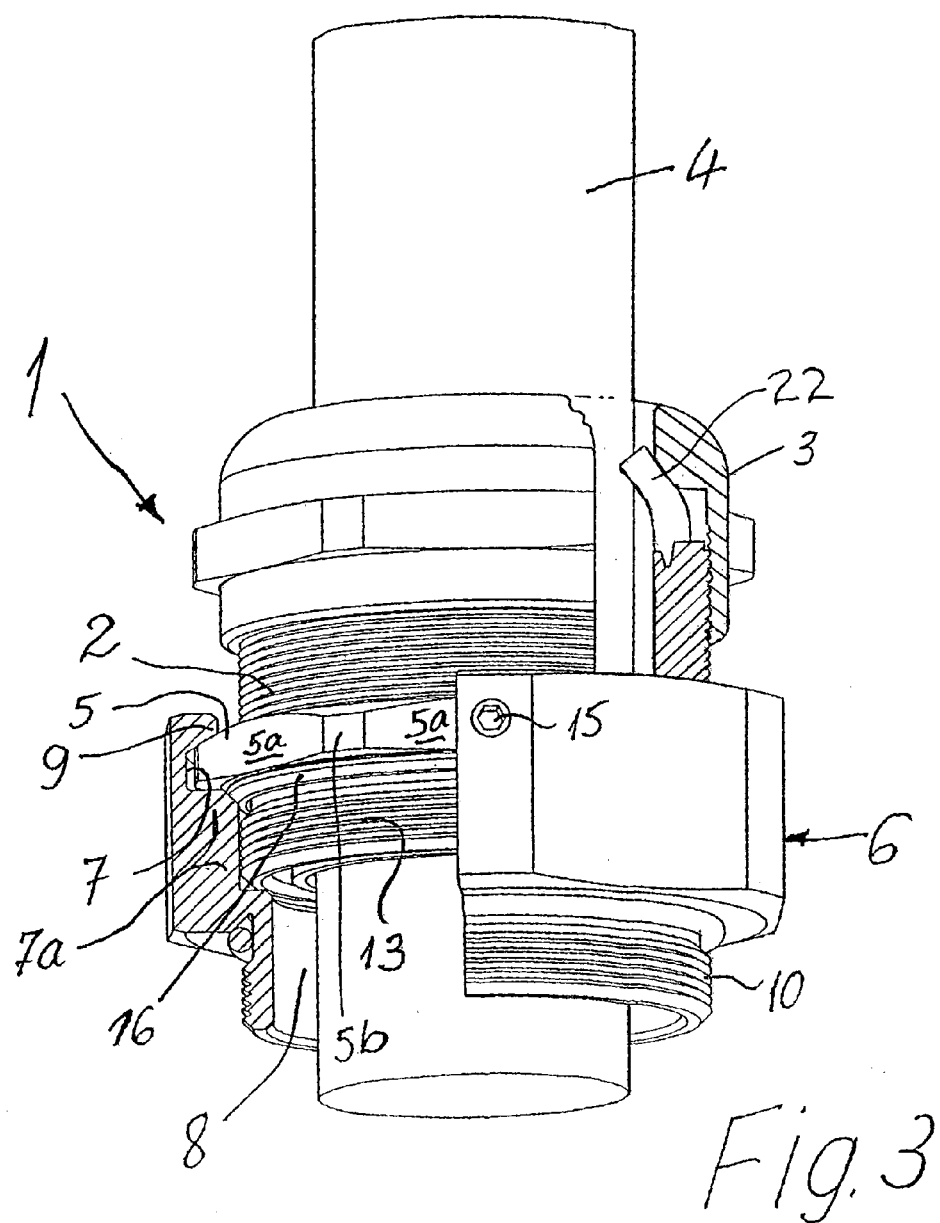
FIG. 3 is a perspective view partially in section of the entire terminal connection with coupling piece in the position of use, wherein the attachment of the coupling piece to a counterpart or housing is not shown for reasons of clarity and wherein an attachment section of the threaded sleeve and a flange adjacent to this attachment section engages in a corresponding depression of the coupling piece.
Figure 4:
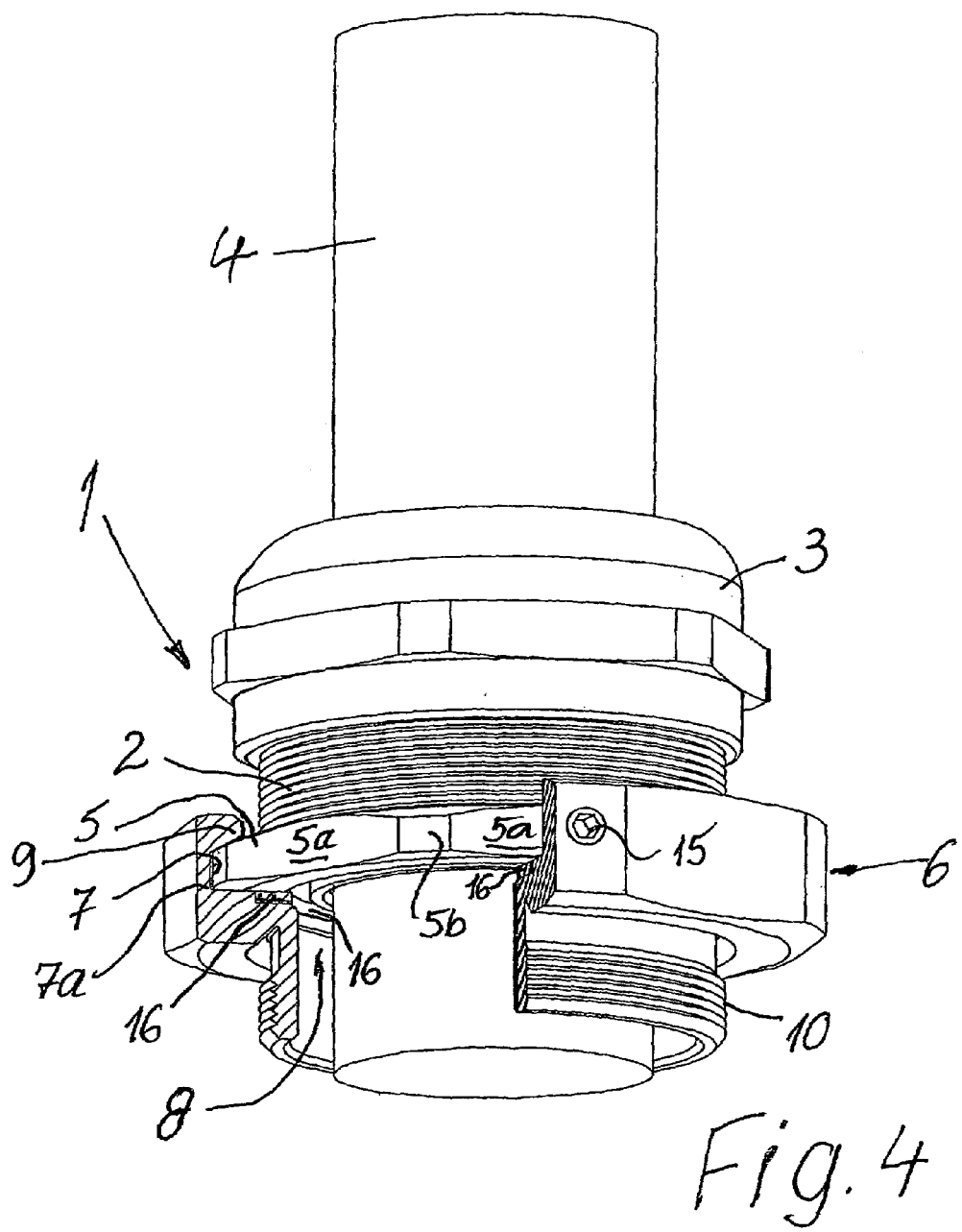
FIG. 4 is a view corresponding to FIG. 3, for which the threaded sleeve of the terminal connection itself has no attachment region, so that for its attachment to a counterpart or housing through-opening in each case a coupling piece according to the invention is required.

This coupling piece 6 has projections 9 directed inwardly in the radial direction on the front or upper edge of the depression 7 in the insertion direction of the threaded sleeve 2 for covering the collar 5 of the threaded sleeve 2 in the coupling position shown in FIGS. 3 and 4.

Furthermore, the coupling piece 6 has adjacent to the depression 7 in the axial direction an attachment region 10 for connecting to a counterpart, as can be seen by comparing FIGS. 1 and 2. There, the connection with a through-opening 11 of a housing 12 shown with only one wall part is shown. The attachment region 10 here has an external thread, which fits an internal thread in the through-opening 11, so that the coupling piece can be screwed into this through-opening 11, after which it has the position shown in FIG. 2. The outside wall 7a of the depression 7 is here embodied as a polygon, preferably a hexagon, in order to provide contact for a corresponding screw-in tool, e.g., for a wrench.

Because the attachment region 10 of the coupling piece 6 has an external thread, a connection with a retaining nut or another counterpart is also possible.

The previously described arrangement enables an elongated body 4, e.g., a cable, to be already connected to a threaded sleeve 2, thus the threaded sleeve 2 with counter-sleeve or cap nut 3 can be preassembled on the elongated body 4, before the attachment, e.g., in the through-opening 11 is performed, without requiring the elongated body 4 to be turned several times for such an attachment, because the threaded sleeve 2 must be coupled only in the coupling piece 6 mounted in the through-opening 11, which is described in more detail in the following.

First, however, it should be mentioned that the embodiments according to FIGS. 3 and 4 have a difference. For the embodiment according to FIG. 3, the threaded sleeve 2 has adjacent to the collar 5, on the side facing away from the counter-sleeve 3, an attachment section 13, e.g., an external thread, by means of which it can be connected in a detachable way to a counterpart or a retaining nut or a through-opening 11 of a housing 12. In this case, it concerns a threaded sleeve 2 of a terminal connection 1, which can also be attached without coupling piece 6 according to the invention on a counterpart, which is then advantageous and can be performed when the connection is not yet performed with the elongated body 4. However, if this is already performed, the attachment can nevertheless be performed with the help of the coupling piece 6 without having to rotate the threaded sleeve 2 for this attachment several times for tightening the thread of its attachment section 13.

The embodiment according to FIG. 4 shows a threaded sleeve 2, which does not have such an attachment section 13 and which thus is to be assembled regularly with an associated coupling piece 6.

The attachment section 13 of the threaded sleeve 2 according to FIG. 3 and the attachment region 10 of the coupling piece 6 are here embodied and dimensioned to match, so that optionally an attachment with or without coupling piece 6 is possible on the same counter thread and counterpart.

In FIGS. 5–8, different outlines of the collar 5 in relation to the radially inner projections 9 and intermediate spaces 14 arranged between these projections are shown, wherein the dimensions in the radial direction in the region of the intermediate spaces 14 are greater than in the region of the projections 9, so that the larger dimensioned sections, especially the edges or other projecting regions 5b of the collar 5 can be inserted in the region of the intermediate spaces 14 into the depression 7.

The extent of the intermediate spaces 14 in the radial and circumferential direction is here equal to or preferably greater than that of the radially projecting regions or edges 5b of the non-round or polygonal collar 5 of the terminal connection 1.

In contrast, the radially inwardly directed projections 9 of the coupling piece 6 project so far that the flattened sections 5a fit between them between the edges 5b or projections of the non-round or polygonal collar 5, as can be clearly seen in FIGS. 5–8.

The non-round or polygonal collar 5 can then be turned under the projections 9 of the coupling piece 6 after the axial insertion at least so far that the projecting regions or edge regions 5b come to lie and are arranged under or behind the projections 9 of the coupling piece 6. The depression 7 is thus dimensioned in the axial direction so that underneath the projections 9 there is sufficient room for the axial extent of the collar 5.

For the assembly, first the coupling piece 6 is attached to a counterpart, especially screwed with its attachment region 10 with an external thread onto a counterpart. Then, the threaded sleeve 2 of the terminal connection already clamped with an elongated body or cable 4 can be inserted with its collar or flange 5 into the depression 7 of this coupling piece 6 in a mutual, relative position, as shown in FIGS. 5–8. Then the threaded sleeve 2 is turned with its counter-sleeve 3 and thus its collar 5, so that the region 5*b* of greater radial dimension of the collar 5 is led under the projections 9 on the inlet into the depression 7, by means of which they are fixed in the axial direction by a positive fit. This type of attachment thus essentially corresponds to a bayonet lock, i.e., the connection between the threaded sleeve 2 and its collar or flange 5 with the coupling piece 6 can also be designated or embodied as a bayonet lock.

To prevent undesired release of this connection, on the coupling piece 6 in the embodiment a terminal screw 15 that can be tightened in the radial direction for exerting pressure on the outside of the collar 5 in the coupling position is arranged, which here is embodied as a stud screw, thus in the position of use it does not project to the outside of the coupling piece 6. Here, this terminal screw 15 is arranged in the region of an intermediate space between two radial projections 9 of the coupling piece 6 at the height of the peripheral surface of the collar 5 engaging in the position of use and exerts pressure in the coupling position on a flat side 5*a* between projecting regions or edges 5*b* at the periphery of the non-round collar 5. Here, the intermediate spaces between the projections 9 on the coupling piece 6 in the region of its outer edges are arranged, so that this terminal screw 15 is located at a region of greater or greatest thickness of the wall 7*a* of the depression 7 and enables a corresponding large number of turns.

According to FIGS. 5–8, the number of projections 9 extending radially inwardly to the coupling piece 6 on the upper edge of the depression 7 and the intermediate spaces arranged between these projections corresponds to the number of edges or projections 5*b* of the collar 5 of the threaded sleeve 2, so that in the coupling position, each corner 5*b* or each region of the collar 5 projecting opposite a flattened section 5*a* is covered by a projection 9.

For coupling or locking the threaded sleeve 2 on the coupling piece 6, here a relative mutual rotation is performed by an angle, which lies considerably under 360° and which is given by dividing 180° by the number of projections 9 or intermediate spaces 14 or edges 5*b*. For the arrangement according to FIG. 5 with six edges 5*b* on the hexagonal collar 5 and a corresponding number of projections 9, thus a rotation by 30° is to be performed to move the edges 5*b* at the center under the projections 9. For the embodiment according to FIG. 6 with eight edges and projections, this rotational angle equals only 22.5°, while for an arrangement with four edges 5*b* according to FIG. 7, the rotational angle necessary for assembly and coupling equals 45°.

FIG. 8 shows an arrangement with two opposing flattened sections of regions 5*b* extending radially, which require a rotation by 90°.

In FIGS. 5–8, the coupling positions are each shown with dashed lines in addition to the original positions.

In one embodiment, while the depression 7 with its limiting wall 7*a* embodied as a hexagon and the attachment region 10 of the coupling piece 6 are arranged one behind the other, wherein the attachment region 10 is provided as supports of lesser radial extent underneath the hexagonal wall 7*a* of the depression 7, this attachment region 10 could also be arranged at an angle relative to the depression, i.e., the coupling piece 6 could also be formed as an angled piece in order to insert an elongated body 4 at a corresponding angle into a housing 12. In such a case, the longitudinal center axis of the attachment region 10 is angled opposite the longitudinal center axis of the depression 7 of the coupling piece 6, e.g., under 90°.

In FIGS. 3 and 4, one can see that within the depression 7 on the side facing the collar 5 in the position of use, an elastic ring 16, namely a sealing ring, is provided as an axial stop for this collar 5. In the embodiment according to FIG. 3, this sealing ring is embodied as an O-ring and in the embodiment according to FIG. 4, it is embodied as a flat seal. This ring 16 is somewhat compressed in the axial direction in the position of use, thus it creates a type of restoring force, which overcomes a play found in the axial direction between the collar 5 and the projections 9. In addition, a seal is created, so that this ring 16 has a double function.

The invention claimed is:

1. Terminal connection (1), comprising a threaded sleeve (2), a counter-sleeve (3) or a pressure part that can be connected to the threaded sleeve, and a terminal insert that can he pressed against an elongated body (4), wherein the counter-sleeve (3) or the pressure part exerts pressure or covers the terminal insert with a ring-shaped contact surface at least at one end and upon tightening a thread with a tapering shape, which is arranged on the terminal insert, in the threaded sleeve (2), or in the counter-sleeve (3), deforms a region of the terminal insert provided with slots or similar free spaces radially against the elongated body and wherein the threaded sleeve (2) has a radially extending collar or flange (5), having peripheral contours that are non-round or polygonal that define radially projecting regions or edges, wherein the terminal connection (1) includes a coupling piece (6) that can be connected therewith in a detachable manner that includes a depression (7) having a through-opening (8) for the elongated body (4), the radially projecting collar (5) of the threaded sleeve (2) fits and can be inserted into the depression (7), the coupling piece (6) has projections (9) directed radially inwardly on a front edge region of the depression (7) in an insertion direction of the threaded sleeve (2) for covering the collar (5) of the threaded sleeve (2) in the coupling position, and the coupling piece (6) adjacent to the depression (7) has an attachment region (10) for connecting to at least one of a counterpart, a retaining nut or a through-opening (11) of the housing (12), wherein the coupling piece (6) has intermediate spaces (14) between the radially inwardly directed projections (9), and a size of the intermediate spaces (14) in the radial and circumferential direction is equal to or greater than that of the radially projecting regions or edges of the collar (5) of the tenninal connection (1).

2. Terminal connection according to claim 1, wherein the attachment region (10) of the coupling piece (6) has an external thread, which fits an internal thread of a housing through-opening (11) or a retaining nut or counterpart.

3. Terminal connection according to claim 1, wherein the threaded sleeve (2) adjacent to the collar (5) has an attachment section (13), through which it is connected in a detachable manner to the at least one of the counterpart, the retaining nut or the through-opening (11) of a housing (12), and the attachment section (13) of the threaded sleeve (2) and the attachment region (10) of the coupling piece (6) are formed and/or dimensioned to match each other.

4. Terminal connection according to claim 1, wherein the radially inwardly directed projections (9) projecting from the coupling piece (6) extend in an opposite direction a sufficient distance so that flattened sections (5*a*) between the projecting regions or the edges (5*b*) of the projections of the non-round or polygonal collar (5) fit between them and the non-round or polygonal collar(5) is rotatable after axial insertion at least so far under the projections (9) of the coupling piece (6) that the projecting regions or the edges (5*b*) are arranged under or behind the radially inwardly directed projections (9) of the coupling piece (6).

5. Terminal connection according to claim 1, wherein on the coupling piece (6) there is at least one terminal screw (15), that can be tightened in a radial direction for exerting pressure on an outside of the collar (5) in the coupling position.

6. Terminal connection according to claim 5, wherein the terminal screw(s) (15) is arranged in a region of an intermediate space between two radial projections (9) of the coupling piece (6) axially at a height of a peripheral surface of the engaging collar (5) in the position of use so that in the coupling position a flat side exerts pressure on the periphery of the non-round collar (5).

7. Terminal connection according to claim 4, wherein a number of the radially inwardly directed projections (9) of the coupling piece (6) and the intermediate spaces arranged between these projections corresponds to a number of edges (5*b*) or regions of the collar (5) of the threaded sleeve (2) projecting opposite the flattened sections.

8. Terminal connection according to claim 4, wherein for coupling or locking the threaded sleeve (2) to the coupling piece (6), a relative mutual rotation is performed by an angle, which is given by dividing 180° by the number of projections (9) or intermediate spaces and edges (5*b*).

9. Terminal connection according to claim 5, wherein the at least one terminal screw comprises a stud screw.

10. Terminal connection according to claim 1, wherein the depression (7) on the coupling piece (6) and the attachment region (10) are arranged axially one behind the other.

11. Terminal connection according to claim 1, wherein at least one of the projections (9) of the coupling piece (6) can be moved from a retracted position approximately radially inwardly, during or after the insertion of the collar as of the threaded sleeve (2) into the depression (7).

12. Terminal connection according to claim 1, wherein within the depression (7) an elastic ring (16), comprising a sealing ring or O-ring, is provided as an axial stop for the collar (5), and the elastic ring is somewhat compressed in the position of use or in the axial direction.

13. Terminal connection according to claim 1, wherein a longitudinal center axis of the attachment region (10) is angled relative to a longitudinal center axis of the depression (7) of the coupling piece (6).

14. Terminal connection according to claim 5, wherein the at least one terminal screw (15) is arranged at a position of greater thickness of the wall (7*a*) of the depression (7).

* * * * *

UNITED STATES PATENT AND TRADEMARK OFFICE
CERTIFICATE OF CORRECTION

PATENT NO.         : 7,128,345 B2                                    Page 1 of 3
APPLICATION NO. : 10/502215
DATED              : October 31, 2006
INVENTOR(S)        : Bartholoma et al.

It is certified that error appears in the above-identified patent and that said Letters Patent is hereby corrected as shown below:

IN THE DRAWINGS

Please add Figures 9 and 10 as shown.

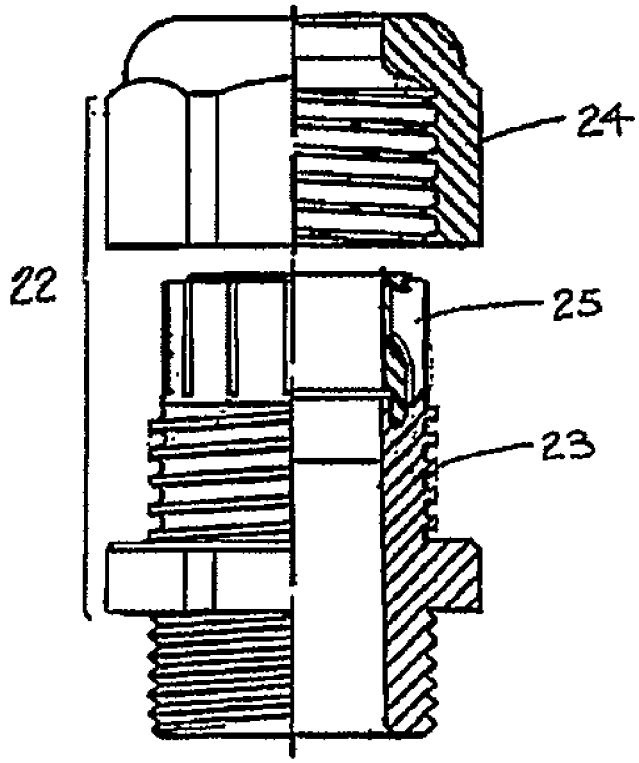

Fig. 9
(Prior Art)

UNITED STATES PATENT AND TRADEMARK OFFICE
CERTIFICATE OF CORRECTION

PATENT NO. : 7,128,345 B2
APPLICATION NO. : 10/502215
DATED : October 31, 2006
INVENTOR(S) : Bartholoma et al.

It is certified that error appears in the above-identified patent and that said Letters Patent is hereby corrected as shown below:

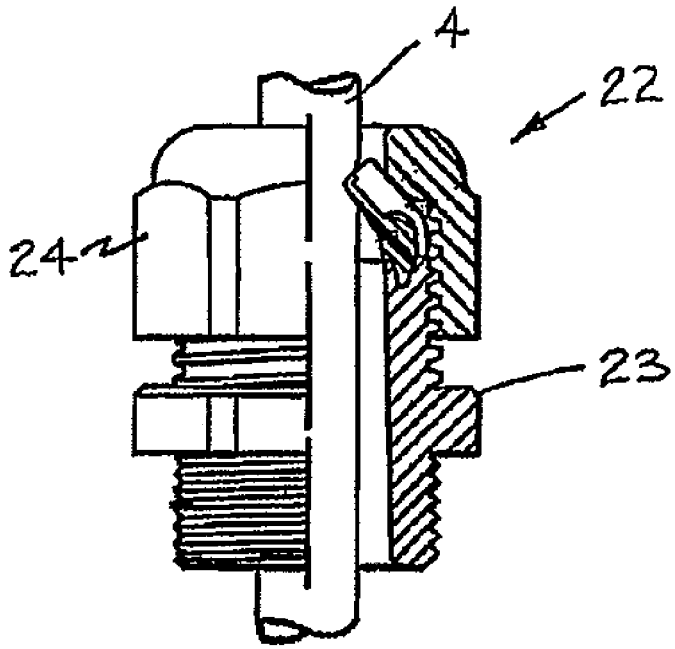

Fig. 10
(Prior Art)

IN THE SPECIFICATION

Please repalce the paragraph beginning with column 1, line 23 with the following:
Such a terminal connection is known in several embodiments from EP 0 528 233 B1 and has proven to be effective. Above all, this known terminal connection, indicated as 22 in Figures 9 and 10, is well suited for mounting, e.g., a cable 4 on a through-opening of a housing, and includes a threaded sleeve 23 and a counter-sleeve or nut 24 which can be threaded together so that the inside of the nut 24 presses inwardly on a terminal insert 25, wherein the contact of the terminal insert 25 on the cable 4 is realized only when the terminal connection 22 is mounted in the through-opening of the housing and the cable has been inserted.

Column 4, line 48, please delete "and also".
Column 4, line 52, please delete "." and insert --,--.

Please add the following new paragraphs at column 4, after line 52:
Figure 9 is a view, partially in cross-section, corresponding to the prior art connection of EP 0 528 233 B1, shown in a disassembled state, and

UNITED STATES PATENT AND TRADEMARK OFFICE
CERTIFICATE OF CORRECTION

| | | |
|---|---|---|
| PATENT NO. | : 7,128,345 B2 | |
| APPLICATION NO. | : 10/502215 | |
| DATED | : October 31, 2006 | |
| INVENTOR(S) | : Bartholoma et al. | |

It is certified that error appears in the above-identified patent and that said Letters Patent is hereby corrected as shown below:

Figure 10 is a view, partially in cross-section, corresponding to the prior art connection of EP 0 528 233 B1, shown in an assembled state clamped to a cable.

IN THE CLAIMS

At column 8, line 17, after the word "can", delete "he" and insert therefor --be--.

At column 8, line 46, after the word "the", delete "tenninal" and insert therefore --terminal--.

At column 10, line 9, after the word "collar", delete "as" and insert therefore --(5)--.

Signed and Sealed this

Fourth Day of September, 2007

JON W. DUDAS
*Director of the United States Patent and Trademark Office*